United States Patent Office 2,776,944
Patented Jan. 8, 1957

2,776,944
RECOVERING SPENT NITRATING LIQUOR

James G. McMillan, Jr., Red Bank, and Warren L. Plunkett, Sayreville, N. J., assignors to Hercules Powder Company, Wilmington, Del., a corporation of Delaware No Drawing. Application March 28, 1956, Serial No. 574,389

12 Claims. (Cl. 252—182)

This invention relates to the separation and recovery from nitrocellulose of spent nitrating mixtures containing essentially nitric acid, magnesium nitrate and water, without degrading the nitrocellulose.

Copending application by Bennett, Brooks, McMillan and Plunkett discloses and claims novel nitric acid esters of cellulose and their preparation by a new method involving nitrating mixtures containing nitric acid, magnesium nitrate, and water as essential ingredients. In that application it is pointed out that following nitration as much as possible of the spent nitrating mixture is removed by suitable means such as gravity drainage, suction, centrifugation, or the like, leaving a cake or mat of nitrocellulose still wet with adhering spent nitrating mixture. It is further disclosed in the aforementioned Bennett et al. application that this wet cake or mat of nitrocellulose is then broken up and drowned in a large excess of water, following substantially the same conventional drowning technique employed in the commercial method of nitration employing mixed nitric and sulfuric acids. The object of the drowning operation is to dilute very rapidly and substantially the adhering spent nitrating mixture remaining on the nitrocellulose and thus prevent hydrolytic damage to the nitrocellulose.

Unfortunately, however, the spent nitrating mixture removed by drowning is so dilute that it is not economical to recover, and consequently it is lost. Since the quantity of spent nitrating mixture lost by drowning amounts to a pound or more for each pound of nitrocellulose produced, it becomes apparent that a method of recovery which would avoid degradation of the nitrocellulose would be highly attractive from an economic point of view.

One object of this invention, therefore, is to provide a method for separating and recovering spent nitrating mixtures from nitrocellulose at concentrations sufficiently high to be economically attractive.

It is a further object of the invention to provide a method for separating and recovering spent nitrating mixtures from nitrocellulose without degrading the nitrocellulose.

Other objects of the invention will appear hereinafter, the novel features and combinations being set forth in the appended claims.

Now in accordance with this invention spent nitrating mixture is separated and recovered from nitrocellulose following nitration of cellulose in a nitrating mixture containing essentially nitric acid, magnesium nitrate, and water by drawing off the bulk of spent nitrating mixture from the nitrocellulose to produce nitrocellulose moist with retained spent nitrating mixture, thereafter rapidly displacing retained spent nitrating mixture from the nitrocellulose with fresh nitric acid of about 60% to about 75% concentration, and recovering the drawn-off and displaced spent nitrating mixture.

According to one embodiment of the invention, the nitrocellulose, following removal of the bulk of spent nitrating mixture, is subjected to a displacement wash with fresh nitric acid of about 60% to about 75% concentration, recycling the discharge from said fresh nitric acid wash as the first displacement wash following removal of the bulk of spent nitrating mixture, and recovering the discharge from said first displacement wash.

In a preferred embodiment of the invention the nitrocellulose, following the displacement wash with fresh nitric acid of about 60% to about 75% concentration, is subjected to washing with a plurality of washing liquids in rapid succession, each succeeding washing liquid being of decreased nitric acid concentration approaching 0 as the limit, each succeeding washing step immediately following the preceding step with each washing liquid in turn being rapidly displaced from the nitrocellulose by the next succeeding washing liquid to produce a succession of wash discharges, and recovering drawn-off and displaced spent nitrating mixture and the wash discharges.

The method in accordance with this invention is particularly well adapted for continuous operation with nitrocellulose in the form of sheets or in shredded, fluffed, or granulated form.

By this invention a substantial portion of the retained spent nitrating mixture formerly lost in the conventional drowning operation is now recovered at concentrations sufficiently high to permit economic recovery of the nitric acid and magnesium nitrate values in the spent mixture for re-use in the nitration process. Signficantly, the separation and recovery of spent nitrating mixture in accordance with this invention are accomplished without deleterious effect to the nitrocellulose.

The general nature of the invention having been set forth, the following examples are given to illustrate some specific embodiments of this invention, but these are not to be construed as limiting the invention.

Example 1

One part by weight of dry shredded wood pulp was dipped or immersed at 50° C. in 38 parts by weight of a nitrating mixture containing 63.90% nitric acid, 21.59% magnesium nitrate, 14.49% water, and 0.02% nitrogen trioxide by weight to form a slurry. The slurry of cellulose was nitrated at about 50° C. for 12 minutes while agitating, after which the slurry of nitrocellulose in the spent nitrating mixture was dumped into a centrifuge and was centrifuged for 1½ minutes to remove the bulk of spent nitrating mixture and to form a mat of nitrocellulose still moist with retained spent nitrating mixture. The spent nitrating mixture drawn off by centrifuging was recovered. At this point in the process the moist mat of nitrocellulose contained 0.95 lb. of nitric acid and 0.33 lb. of magnesium nitrate per lb. of nitrocellulose.

Following the initial centrifuging to remove the bulk of spent nitrating mixture the moist mat of nitrocellulose was rapidly spray-washed in the centrifuge with approximately 6.85 parts by weight of 60% fresh nitric acid substantially free of magnesium nitrate for each part of cellulose originally employed, applying the washing acid in a period of approximately 10 seconds with the centrifuge spinning, and recovering the wash discharge. This displacement wash with 60% fresh nitric acid was followed immediately without any time lapse with a similar rapid spray wash of 40% nitric acid, applying approximately 6.25 parts by weight for each part of cellulose originally employed in approximately 10 seconds with the centrifuge spinning, and recovering the wash discharge. This was followed immediately without any time lapse with a similar rapid spray wash of 20% nitric acid, applying approximately 5.6 parts by weight for each part of cellulose originally employed in approximately 10 seconds with the centrifuge spinning, and recovering the wash discharge. This was followed immediately without any time lapse with a similar rapid spray wash of water, applying approximately 10 parts by weight for each part of cellulose originally employed in approximately 10 seconds with the centrifuge spinning, followed by centrifuging for 1½ minutes, and recovering the wash discharge.

At this point in the process the nitrocellulose contained 0.163 lb. nitric acid and 0.059 lb. magnesium nitrate per lb. of nitrocellulose. Therefore, the amount of nitric acid and magnesium nitrate recovered by the above washing procedure amounted to 83% and 82%, respectively, of nitric acid and magnesium nitrate which would have been lost in conventional drowning procedure.

The nitrocellulose was subsequently further washed with water until free of acid, and was dried in a stream denitration of the nitrocellulose resulting from the wash- of air at about 60° C. There was substantially no denitration of the nitrocellulose resulting from the washing and recovery procedure described above. The recovered nitrocellulose dissolved substantially completely in a solvent composed of 20% ethyl acetate, 25% ethyl alcohol, and 55% toluene by weight to form a smooth, clear 6.1% solution, based on the nitrocellulose, substantially free of gels or granularity, thus presenting further evidence that the nitrocellulose was not degraded by the above-described washing and recovery procedure.

Example 2

One part by weight of dry shredded wood pulp was dipped or immersed at 50° C. in 51 parts by weight of a nitrating mixture containing 64.71% nitric acid, 20.66% magnesium nitrate, 14.59% water, and 0.04% nitrogen trioxide by weight to form a slurry. The slurry of cellulose was nitrated at about 50° C. for 12 minutes while agitating, after which the slurry of nitrocellulose in the spent nitrating mixture was dumped into a washing column connected at its base with a suction line, and the bulk of the spent nitrating mixture was drawn off with suction to form a mat of nitrocellulose moist with spent nitrating mixture. The drawn-off spent nitrating mixture was recovered. At this point in the process the moist mat of nitrocellulose contained 2.45 lb. of nitric acid and 0.81 lb. of magnesium nitrate per pound of nitrocellulose.

As soon as the bulk of spent nitrating mixture was drawn off by suction, approximately 6.85 parts by weight of 60% fresh nitric acid substantially free of magnesium nitrate for each part of cellulose originally employed was distributed over the mat of nitrocellulose in the washing column with suction applied to rapidly displace retained spent nitrating mixture which was recovered. This displacement washing step with 60% fresh nitric acid required about 10 seconds, and was followed immediately without any time lapse with a similar rapid displacement wash of 40% intric acid which required about 10 seconds with suction applied, employing approximately 6.25 parts by weight for each part of cellulose originally employed, and recovering the wash discharge. This was followed immediately without any time lapse with a similar rapid displacement wash of 20% nitric acid which required about 10 seconds with suction applied, employing approximately 5.6 parts by weight for each part of cellulose originally employed, and recovering the wash discharge. This was followed immediately without any time lapse with a similar rapid displacement wash with water which required about 10 seconds with suction applied, employing approximately 4.8 parts by weight for each part of cellulose originally employed, and recovering the wash discharge.

At this point in the process the nitrocellulose contained 0.27 lb. of nitric acid and 0.09 lb. magnesium nitrate per lb. of nitrocellulose. Therefore, the amount of nitric acid and magnesium nitrate recovered by the above washing procedure amounted to 89% and 89%, respectively, of nitric acid and magnesium nitrate which would have been lost in conventional drowning procedure.

The nitrocellulose was subsequently further washed with water until free of acid, and was dried in a stream of air at about 60° C. There was substantially no denitration of the nitrocellulose resulting from the washing and recovery procedure described above. The recovered nitrocellulose dissolved substantially completely in a solvent composed of 20% ethyl acetate, 25% ethyl alcohol, and 55% toluene by weight to form a smooth, clear 6.1% solution, based on the nitrocellulose, substantially free of gels or granularity, thus presenting further evidence that the nitrocellulose was not degraded by the above-described washing and recovery procedure.

Example 3

Following substantially the same procedure set forth in Example 1, cellulose was nitrated, and the nitrocellulose was separated from the bulk of spent nitrating mixture in the centrifuge, given an initial displacement wash with 75% fresh nitric acid substantially free of magnesium nitrate, followed by successive displacement washes with 60%, 40%, and 20% nitric acid, and finally with water in the same manner set forth in Example 1, employing approximately 7.1 parts by weight of 75% fresh nitric acid, 6.85 parts 60% nitric acid, 6.25 parts 40% nitric acid, 5.6 parts 20% nitric acid, and 10 parts water for each part of cellulose originally employed, each wash requiring approximately 10 seconds without time lapse between washing steps, and recovering the wash discharges.

Following separation of the bulk of spent nitrating mixture from the nitrocellulose, but before commencing the displacement washing, the moist mat of nitrocellulose contained 0.95 lb. nitric acid and 0.33 lb. magnesium nitrate per lb. of nitrocellulose. Following displacement washing as set forth above with 75% fresh nitric acid and with 60%, 40%, and 20% nitric acid washing liquids and finally with water as stated above, the nitrocellulose contained 0.092 lb. nitric acid and 0.049 lb. magnesium nitrate per lb. of nitrocellulose, thus demonstrating substantial recovery of retained spent nitrating mixture.

The recovered nitrocellulose, after final washing and drying as set forth in Example 1, was substantially free of denitration and formed a clear, smooth 6.1% solution substantially free of gels or granularity in a solvent composed of 20% ethyl acetate, 25% ethyl alcohol, and 55% toluene by weight, thus demonstrating that the nitrocellulose was not degraded.

Following nitration of cellulose in a nitrating mixture containing essentially nitric acid, magnesium nitrate, and water, the resulting nitrocellulose contains a large excess of spent nitrating mixture. The bulk of this spent nitrating mixture in accordance with this invention is then drawn off by any suitable means such as by centrifugation, suction, or similar means to produce nitrocellulose moist with retained spent nitrating mixture. The spent nitrating mixture thus drawn off is recovered for reuse in the process.

Although the bulk of spent nitrating mixture can be drawn off relatively slowly by means of gravity drainage, provided the moist nitrocellulose is suitably protected from undue exposure to moist or humid air, such operation does not ordinarily fit in well with an integrated commercial process. Hence, it is preferred to draw off the bulk of spent nitrating mixture rapidly by centrifugation or suction or similar means to minimize the chances of exposure to moist or humid air.

Following removal of the bulk of spent nitrating mixture from the nitrocellulose by centrifuging or similar means, it is very important to displace retained spent nitrating mixture which is relatively high in magnesium nitrate content with a nitric acid liquid which is much lower in magnesium nitrate content without substantially reducing the acid strength of the retained liquid at this stage in the production of nitrocellulose. This is accomplished by displacement washing with fresh nitric acid of about 60% to about 75% concentration substantially free of magnesium nitrate. By this means precipitation of magnesium nitrate in the nitrocellulose is avoided and overall recovery of magnesium nitrate is improved. It will be apparent, of course, that the concentration in terms of nitric acid content of the nitric acid liquid remaining in the nitrocellulose following displacement washing with fresh nitric acid of about 60% to about 75% concentration will be intermediate between that of the spent nitrating mixture displaced and that of the fresh acid employed for such displacement washing. At the same time the magnesium nitrate content of the nitric acid liquid remaining in the nitrocellulose following displacement washing with fresh nitric acid of about 60% to about 75% concentration will be substantially lower than that present in the discharge from such displacement washing, since the fresh nitric acid employed therefor is substantially free of magnesium nitrate content. Fresh nitric acid of concentrations below about 60% tends to cause magnesium nitrate to crystallize out in the nitrocellulose making its removal in subsequent washing operations extremely difficult. Fresh nitric acid of concentrations above about 75% tends to have a softening and gelling action on the nitrocellulose which is undesirable in that it makes washing out of residual spent nitrating mixture extremely difficult, and also tends to degrade the nitrocellulose.

In a majority of cases where the retained spent nitrating mixture remaining in the nitrocellulose, following removal of the bulk of spent nitrating mixture, contains up to about 75% to 80% nitric acid, the fresh nitric acid of about 60% to about 75% concentration will ordinarily be employed as the first displacement wash after removal of the bulk of spent nitrating mixture. However, in some instances, particularly when the retained spent nitrating mixture remaining in the nitrocellulose contains on the order of about 80% or more nitric acid, it will be found economically desirable and attractive to employ the fresh nitric acid of about 60% to about 75% concentration substantially free of magnesium nitrate as the second displacement wash, recycling the discharge from the fresh nitric acid wash as the first displacement wash following removal of the bulk of spent nitrating mixture.

The amount of fresh nitric acid of about 60% to about 75% concentration substantially free of magnesium nitrate employed for displacement washing will ordinarily be between about 0.8 and about 10 parts by weight per part of nitrocellulose. Larger amounts could be used but such practice would be economically wasteful.

After removal of the bulk of spent nitrating mixture from the nitrocellulose, the resulting nitrocellulose moist with retained spent nitrating mixture could be kept in this condition for several hours without being harmed if no moisture is allowed to contact it. Preferably, however, the first displacement wash is initiated as soon as the bulk of spent nitrating mixture is removed from the nitrocellulose to minimize the chances of harming the nitrocellulose at this stage by undue exposure to moist air. Upon being initiated, the first displacement wash must be carried out rapidly. This is important. With the usual shredded or fluffed forms of chemical cellulose it has been found that the first displacement wash is accomplished in a matter of a few seconds, ordinarily about 10 seconds being required. It will be apparent that the density of the nitrocellulose aggregate being washed will have an influence on the time required for the first displacement wash, very fluffy open aggregates requiring less time than more dense aggregates. Seldom, however, will the time required for this displacement wash exceed 15 or 20 seconds.

In a preferred embodiment of the invention the nitrocellulose, following displacement of retained spent nitrating mixture with a washing liquid of fresh nitric acid of about 60% to about 75% concentration, is subjected to washing with a plurality of washing liquids in rapid succession. Each succeeding washing liquid contains decreased nitric acid content, approaching 0 as the limit, the final washing liquid being either very dilute acid, or preferably water. It is apparent, therefore, that the washing procedure in accordance with this invention is in effect a countercurrent washing procedure, for the nitrocellulose having the greatest concentration of retained spent nitrating mixture is washed with the strongest nitric acid, the nitrocellulose having the least concentration of retained spent nitrating mixture is washed with water or very dilute acid. Obviously, the number of such washing liquids could be very large with very small decreases in nitric acid strength with each succeeding washing liquid. Ordinarily, however, the number of such washes will be held to as few as possible consistent with economic recovery of a substantial proportion of the nitric acid and magnesium nitrate values remaining in the nitrocellulose after centrifuging or the like. Four, five or six washes, including the displacement wash with fresh nitric acid of about 60% to about 75% concentration are usually adequate for this purpose. To illustrate, if the first displacement wash is accomplished with 75% fresh nitric acid, then succeeding washing liquids may be 60%, 40%, and 20% nitric acids, and finally water or very dilute acid. If 60% fresh nitric acid is employed for the first displacement wash, then succeeding washing liquids may be 40% and 20% nitric acids, and finally water or very dilute acid. This represents about the minimum number of washing liquids which will effectively accomplish the purposes of this invention. It will be understood, of course, that the composition and number of washing liquids set forth above are merely by way of example, and other compositions and numbers of washing liquids can be used without departing from the scope of the invention.

The entire washing schedule in accordance with this invention upon being initiated must be carried out rapidly in order to avoid degradation of the nitrocellulose. There should be no appreciable time lapse between wash No. 1 and wash No. 2. Similarly, there should be no appreciable time lapse between the other washing steps making up the washing schedule. Preferably, the second wash follows immediately after the first wash and is carried out rapidly. Similarly, the third, fourth, etc., washes follow the preceding wash immediately and each is carried out rapidly, in general each wash requiring only a few seconds to accomplish. Ordinarily, only about 10 seconds are required for each wash step, the time requirements conforming generally with the time requirements for the first wash as set forth hereinbefore.

It will be seen, therefore, that the entire displacement washing procedure will ordinarily be completed in a matter of a minute or less, and rarely, if ever, will the entire displacement washing procedure require more than 1½ minutes.

It will be apparent from the foregoing description that the wash discharge from each displacement washing step following the first step will be more concentrated with respect to both nitric acid and magnesium nitrate content than the washing liquid employed to produce that particular wash discharge. In practicing the invention, advantage is taken of this fact in building up the concentration of nitric acid and magnesium nitrate values in the wash discharges to a point where it is economically attractive to recover these values. According to one embodiment of the invention this is accomplished by employing each wash discharge except the wash discharges from washing steps 1 and 2 as the washing liquid in the preceding washing step in the next succeeding washing cycle employing fresh unwashed nitrocellulose. To illustrate, by way of example, in any given washing cycle after initiation of the process with initially prepared washing liquids, wash discharge from washing step No. 3 becomes washing liquid for washing step No. 2 in the next succeeding cycle with fresh unwashed nitrocellulose, wash discharge from washing step No. 4 becomes washing liquid in washing step No. 3, etc., water or very dilute acid, of course, being the final washing liquid in each cycle. The wash discharges from washing steps 1 and 2 are ordinarily sufficiently high in nitric acid and magnesium nitrate so that these wash discharges are sent to a recovery system to recover the nitric acid and magnesium nitrate values. In a particular instance in which nitrocellulose, following withdrawal of the bulk of spent nitrating mixture, was displacement washed with 75% fresh nitric acid, and with 60%, 40%, and 20% nitric acids, and finally with water, thus employing a 5-step displacement washing procedure, the composition of the wash discharges from each of the five steps was as follows:

| Constituents in Wash Discharges | Percentage Composition of Wash Discharge from— | | | | |
|---|---|---|---|---|---|
| | Step 1 | Step 2 | Step 3 | Step 4 | Step 5 |
| Nitric Acid | 62.84 | 61.96 | 53.38 | 38.52 | 24.04 |
| Magnesium Nitrate | 14.85 | 8.24 | 6.96 | 4.96 | 3.11 |
| Water | 22.24 | 29.79 | 39.66 | 56.52 | 72.85 |
| Nitrogen Trioxide | 0.07 | 0.01 | 0.00 | 0.00 | 0.00 |

In this particular instance wash discharges from steps 1 and 2 were sent to recovery. Wash discharge from step 3 became washing liquid in step 2 of the next succeeding washing cycle with a fresh batch of unwashed nitrocellulose, wash discharge from step 4 became washing liquid in step 3 of the next succeeding washing cycle, wash discharge from step 5 became washing liquid in step 4 of the next succeeding washing cycle, water was employed as the washing liquid for step 5 in the next succeeding washing cycle, with fresh nitric acid of 75% strength being employed as the washing liquid in step 1. A similar succession is repeated for each batch of unwashed nitrocellulose being washed.

In another embodiment of the invention wherein six washing steps were employed, and wherein fresh nitric acid of 60% concentration substantially free of magnesium nitrate was employed as the second displacement wash, the wash discharge therefrom being employed as the washing liquid for the first displacement wash, the composition of the washing liquids for each of the six steps was as follows:

| Wash No. | Composition of Washing Liquid | | |
|---|---|---|---|
| | HNO$_3$ | Mg(HO$_3$)$_2$ | Water |
| 1 | 68 | 4 | 28 |
| 2 | 60 | | 40 |
| 3 | 38.7 | 2.1 | 59.2 |
| 4 | 24.6 | 1.2 | 74.2 |
| 5 | 11.5 | 0.4 | 88.1 |
| 6 | | | 100 |

In this embodiment the wash discharge from washing step No. 3 was sent to recovery, while the wash discharge from washing step No. 1 was fortified with concentrated nitric acid and concentrated magnesium nitrate and recycled to the nitration reaction as the nitrating mixture therefor. If desired, the wash discharge from washing step No. 3 could be combined with the fresh nitric acid and employed as the washing liquid in washing step No. 2, since the magnesium nitrate content of the wash discharge from washing step No. 3 is substantially lower than the magnesium nitrate content of the spent nitrating mixture.

This invention is applicable for the recovery of spent nitrating mixture from any nitrocellulose which is the reaction product of cellulose with a nitrating mixture containing essentially nitric acid, magnesium nitrate and water, the ratio of magnesium nitrate to water being at least about 1.2:1 and not more than about 2.2:1 by weight, preferably between about 1.3:1 and about 2:1, and the nitric acid being present in an amount sufficient to yield a nitrocellulose having a nitrogen content of from about 11% to about 13.5% by weight. It will be understood, of course, that the sum of the three essential compounds will constitute substantially 100% of the nitrating mixture, any N$_2$O$_3$ being only an incidental ingredient in the nitrating mixture, since it is well recognized that concentrated nitric acid often contains small percentages of N$_2$O$_3$, usually on the order of 0.1% or less.

Although for most purposes the nitrating mixtures will usually contain between about 45% and about 94% nitric acid, between about 3.3% and about 34% magnesium nitrate, and between about 2.7% and about 21% water by weight, it is to be understood that the nitrating mixtures are not to be construed as limited in this respect, since the important feature is the ratio of magnesium nitrate to water as set forth hereinabove, nitric acid being present in an amount sufficient to yield a nitrocellulose having a nitrogen content of from about 11% to about 13.5% by weight. More specific nitrating mixtures suitable for preparing most types of nitrocellulose contain essentially between about 45% and about 80% nitric acid, between about 10% and about 34% magnesium nitrate, and between about 7% and about 21% water, the ratio of magnesium nitrate to water being at least about 1.2:1 and not more than about 2.2:1, preferably between about 1.3:1 and about 2:1 by weight.

Within the aforestated limits there are numerous nitrating mixtures for preparing any particular nitrocellulose desired. Likewise, within the aforestated limits there are nitrating mixtures suitable for preparing substantially all commercial types of nitrocellulose. The particular nitrating mixture employed will, therefore, be largely a matter of choice governed primarily by economic and end use considerations, it being apparent that the higher nitrogen-type nitrocellulose require nitrating mixtures high in nitric acid content and low in water content within the limits set forth.

It has already been emphasized hereinbefore that the separation and recovery method in accordance with this invention is particularly well adapted for continuous operation. When nitrocellulose in shredded, fluffed or granulated form is suspended as a slurry in spent nitrating mixture the continuous separation and recovery method of this invention can be performed in conventional continuous centrifuges.

When nitrocellulose is in sheet form it can be passed continuously over successive suction means, such as suction filter or boxes, being subjected over each suction means in turn to a rapid displacement wash with appropriate washing liquid as hereinbefore set forth.

Nitrocellulose treated in accordance with this invention is subsequently washed free of residual acid and may then be treated by any of the well-known and conventional methods for adjusting viscosity, bleaching, dehydration, and the like, as desired.

The method of this invention makes possible substantial recovery of nitric acid and magnesium nitrate values from retained spent nitrating mixtures which heretofore have been lost through lack of a suitable means of recovery. Moreover, the method of this invention accomplishes substantial recovery of nitric acid and magnesium nitrate values from retained spent nitrating mixtures without degrading the nitrocellulose.

This is a continuation-in-part of our copending application, Serial No. 327,146, filed December 20, 1952, now abandoned.

What we claim and desire to protect by Letters Patent is:

1. A method of separating and recovering spent nitrating mixture from nitrocellulose following nitration of cellulose in a nitrating mixture containing essentially nitric acid, magnesium nitrate, and water which comprises drawing off the bulk of spent nitrating mixture from the nitrocellulose to produce nitrocellulose moist with retained spent nitrating mixture, thereafter rapidly displacing retained spent nitrating mixture from the nitrocellulose with fresh nitric acid having a concentration between about 60% and about 75% by weight and being substantially free of magnesium nitrate to produce nitrocellulose moist with nitric acid having a substantially lower magnesium nitrate content than said spent nitrating mixture, and recovering the drawn-off and displaced spent nitrating mixture.

2. A continuous method of separating and recovering spent nitrating mixture from nitrocellulose following nitration of cellulose in a nitrating mixture containing essentially nitric acid, magnesium nitrate, and water which comprises continuously drawing off the bulk of spent nitrating mixture from the nitrocellulose to produce nitrocellulose moist with retained spent nitrating mixture, thereafter continuously rapidly displacing retained spent nitrating mixture from the nitrocellulose with fresh nitric acid having a concentration between about 60% and about 75% by weight and being substantially free of magnesium nitrate to produce nitrocellulose moist with nitric acid having a substantially lower magnesium nitrate content than said spent nitrating mixture, and continuously recovering the drawn-off and displaced spent nitrating mixture.

3. A continuous method of separating and recovering spent nitrating mixture from a sheet of nitrocellulose following nitration of a sheet of cellulose in a nitrating mixture containing essentially nitric acid, magnesium nitrate, and water which comprises continuously drawing off the bulk of spent nitrating mixture from the sheet of nitrocellulose to produce a sheet of nitrocellulose moist with retained spent nitrating mixture, thereafter continuously rapidly displacing retained spent nitrating mixture from the sheet of nitrocellulose with fresh nitric acid having a concentration between about 60% and about 75% by weight and being substantially free of magnesium nitrate to produce nitrocellulose moist with nitric acid having substantially lower magnesium nitrate content than said spent nitrating mixture, and continuously recovering the drawn-off and displaced spent nitrating mixture.

4. A method of separating and recovering spent nitrating mixture from a slurry with nitrocellulose, said slurry resulting from the nitration of cellulose in a nitrating mixture containing essentially nitric acid, magnesium nitrate, and water which comprises drawing off the bulk of spent nitrating mixture from the nitrocellulose slurry to produce a mat of nitrocellulose moist with retained spent nitrating mixture, thereafter rapidly displacing retained spent nitrating mixture from the mat of nitrocellulose with fresh nitric acid having a concentration between about 60% and about 75% by weight and being substantially free of magnesium nitrate to produce nitrocellulose moist with nitric acid having a substantially lower magnesium nitrate content than said spent nitrating mixture, and recovering the drawn-off and displaced spent nitrating mixture.

5. A method of separating and recovering nitrating mixture from a slurry with nitrocellulose, said slurry resulting from the nitration of cellulose in a nitrating mixture containing essentially nitric acid, magnesium nitrate, and water which comprises centrifuging the bulk of spent nitrating mixture from the nitrocellulose slurry to produce a mat of nitrocellulose moist with retained spent nitrating mixture, thereafter rapidly displacing retained spent nitrating mixture from the mat of nitrocellulose with fresh nitric acid having a concentration between about 60% and about 75% by weight and being substantially free of magnesium nitrate to produce nitrocellulose moist with nitric acid having a substantially lower magnesium nitrate content than said spent nitrating mixture, and recovering the centrifuged and displaced spent nitrating mixture.

6. A method of separating and recovering spent nitrating mixture from a slurry with nitrocellulose, said slurry resulting from the nitration of cellulose in a nitrating mixture containing essentially nitric acid, magnesium nitrate, and water which comprises drawing off with suction the bulk of spent nitrating mixture from the nitrocellulose slurry to produce a mat of nitrocellulose moist with retained spent nitrating mixture, thereafter rapidly displacing retained spent nitrating mixture from the mat of nitrocellulose with fresh nitric acid having a concentration between about 60% and about 75% by weight and being substantially free of magnesium nitrate to produce nitrocellulose moist with nitric acid having substantially lower magnesium nitrate content than said spent nitrating mixture, and recovering the drawn-off and displaced spent nitrating mixture.

7. A method of separating and recovering spent nitrating mixture from nitrocellulose following nitration of cellulose in a nitrating mixture containing essentially nitric acid, magnesium nitrate, and water which comprises drawing off the bulk of spent nitrating mixture from the nitrocellulose to produce nitrocellulose moist with retained spent nitrating mixture, thereafter rapidly displacing retained spent nitrating mixture from the nitrocellulose with a washing liquid of nitric acid having a concentration between about 60% and about 75% by weight and being substantially free of magnesium nitrate to produce nitrocellulose moist with nitric acid having a substantially lower magnesium nitrate content than said spent nitrating mixture, subjecting the nitrocellulose to a series of washes in rapid succession after the fresh nitric acid wash, in which each succeeding washing liquid is of decreased nitric acid concentrations approaching 0 as the limit, each succeeding washing step immediately following the preceding step with each washing liquid in turn being rapidly displaced from the nitrocellulose by the next succeeding washing liquid to produce a succession of wash discharges, and recovering drawn-off and displaced spent nitrating mixture and the wash discharges.

8. A method of separating and recovering spent nitrating mixture from a slurry with nitrocellulose, said slurry resulting from the nitration of cellulose in a nitrating mixture containing essentially nitric acid, magnesium nitrate, and water which comprises drawing off the bulk of spent nitrating mixture from the nitrocellulose to produce a mat of nitrocellulose moist with retained spent nitrating mixture, thereafter rapidly displacing retained spent nitrating mixture from the mat of nitrocellulose with a washing liquid of fresh nitric acid having a concentration between about 60% and about 75% by weight and being substantially free of magnesium nitrate to produce nitrocellulose moist with nitric acid having substantially lower magnesium nitrate content than said spent nitrating mixture, subjecting the nitrocellulose to a series of washes in rapid succession after the fresh nitric acid wash, in which each succeeding washing liquid is of decreased nitric acid concentration, the final washing liquid being water, each succeeding washing step immediately following the preceding step with each washing liquid in turn being rapidly displaced from the nitrocellulose by the next succeeding washing liquid to produce a succession of wash discharges, and recovering drawn-off and displaced spent nitrating mixture and the wash discharges.

9. A continuous method of separating and recovering spent nitrating mixture from nitrocellulose following nitration of cellulose in a nitrating mixture containing essentially nitric acid, magnesium nitrate, and water which comprises continuously drawing off the bulk of spent nitrating mixture from the nitrocellulose to produce nitrocellulose moist with retained spent nitrating mixture, thereafter continuously rapidly displacing retained spent nitrating mixture from the nitrocellulose with a washing liquid of fresh nitric acid having a concentration between about 60% and about 75% by weight and being substantially free of magnesium nitrate to produce nitrocellulose moist with nitric acid having substantially lower magnesium nitrate content than said spent nitrating mixture, continuously subjecting the nitrocellulose to a series of washes in rapid succession after the fresh nitric acid wash, in which each succeeding washing liquid is of decreased nitric acid concentration, the final washing liquid being water, each succeeding washing step immediately following the preceding step with each washing liquid in turn being rapidly displaced from the nitrocellulose by the next succeeding washing liquid to produce a succession of wash discharges, and continuously recovering drawn-off and displaced spent nitrating mixture and the wash discharges.

10. A method of separating and recovering spent nitrating mixture from nitrocellulose following nitration of cellulose in a nitrating mixture containing essentially nitric acid, magnesium nitrate, and water which comprises drawing off the bulk of spent nitrating mixture from the nitrocellulose to produce nitrocellulose moist with retained spent nitrating mixture, recovering the drawn-off spent nitrating mixture, thereafter rapidly displacing retained spent nitrating mixture from the nitrocellulose with a washing liquid of fresh nitric acid having a concentration between about 60% and 75% by weight and being substantially free of magnesium nitrate to produce nitrocellulose moist with nitric acid having substantially lower magnesium nitrate content than said spent nitrating mixture, recovering the discharge from the fresh nitric acid wash, and subjecting the nitrocellulose to a series of washes in rapid succession after the fresh nitric acid wash, in which each succeeding washing liquid is of decreased nitric acid concentration approaching 0 as the limit, and in which the discharge from the first wash is recovered and the discharge from each succeeding wash is recycled to the preceding wash.

11. A method of separating and recovering spent nitrating mixture from nitrocellulose following nitration of cellulose in a nitrating mixture containing essentially nitric acid, magnesium nitrate, and water which comprises drawing off the bulk of spent nitrating mixture from the nitrocellulose to produce nitrocellulose moist with retained spent nitrating mixture, recovering the drawn-off spent nitrating mixture, thereafter subjecting the nitrocellulose to a displacement wash with fresh nitric acid having a concentration between about 60% and about 75% by weight and being substantially free of magnesium nitrate to produce nitrocellulose moist with nitric acid having a substantially lower magnesium nitrate content than said spent nitrating mixture, recycling the discharge from the fresh nitric acid wash as the first displacement wash following removal of the bulk of spent nitrating mixture, and recovering the discharge from said first displacement wash.

12. A method in accordance with claim 11 wherein the nitrocellulose is subjected to a series of washes in rapid succession after the fresh nitric acid wash, in which each succeeding washing liquid is of decreased nitric acid concentration approaching 0 as the limit, and in which the discharge from the first wash after the fresh nitric acid wash is recovered and the discharge from each succeeding wash is recycled to the preceding wash.

References Cited in the file of this patent
UNITED STATES PATENTS

| | | |
|---|---|---|
| 2,310,862 | Nessler | Feb. 9, 1943 |
| 2,367,533 | Sillick | Jan. 16, 1945 |
| 2,403,493 | Bouchard et al. | July 9, 1946 |